(12) United States Patent
Chang et al.

(10) Patent No.: US 8,867,044 B2
(45) Date of Patent: Oct. 21, 2014

(54) COMPUTING DEVICE AND METHOD FOR SCANNING EDGES OF AN OBJECT

(75) Inventors: Chih-Kuang Chang, New Taipei (TW); Li Jiang, Shenzhen (CN); Zhong-Kui Yuan, Shenzhen (CN); Dong-Hai Li, Shenzhen (CN); Zhi-Jun Zou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 167 days.

(21) Appl. No.: 13/594,857

(22) Filed: Aug. 26, 2012

(65) Prior Publication Data

US 2013/0169975 A1    Jul. 4, 2013

(30) Foreign Application Priority Data

Dec. 28, 2011    (CN) .......................... 2011 1 0448838

(51) Int. Cl.
*G01B 11/24*    (2006.01)
*G01B 11/02*    (2006.01)
*G06T 7/00*    (2006.01)

(52) U.S. Cl.
CPC ............ *G01B 11/028* (2013.01); *G06T 7/0085* (2013.01)
USPC ...................................................... 356/609

(58) Field of Classification Search
CPC .. G02B 21/002; G02B 21/006; G02B 21/008; G01B 11/028; G01B 11/03; G06T 7/0085; G06T 2207/30136; G06T 2207/30116
See application file for complete search history.

(56) References Cited

U.S. PATENT DOCUMENTS

| | | | | |
|---|---|---|---|---|
| 5,438,413 A * | 8/1995 | Mazor et al. | .................. | 356/508 |
| 5,661,816 A * | 8/1997 | Fantone et al. | ............... | 382/100 |
| 6,449,087 B2 * | 9/2002 | Ogino | ........................... | 359/383 |
| 6,711,283 B1 * | 3/2004 | Soenksen | ...................... | 382/133 |
| 7,212,660 B2 * | 5/2007 | Wetzel et | ....................... | 382/128 |
| 7,253,385 B2 * | 8/2007 | Tanemura et al. | .......... | 250/201.3 |
| 7,345,814 B2 * | 3/2008 | Yoneyama et al. | ........... | 359/383 |
| 7,355,702 B2 * | 4/2008 | Yamashita et al. | ............ | 356/301 |
| 2010/0158496 A1 * | 6/2010 | Chang et al. | .................. | 396/125 |
| 2010/0172020 A1 * | 7/2010 | Price et al. | ..................... | 359/381 |
| 2012/0154571 A1 * | 6/2012 | Bryll | ............................... | 348/94 |
| 2012/0305768 A1 * | 12/2012 | Yamamoto et al. | ........... | 250/310 |
| 2013/0337437 A1 * | 12/2013 | Henze et al. | ..................... | 435/5 |

* cited by examiner

*Primary Examiner* — Tarifur Chowdhury
*Assistant Examiner* — Juan D Valentin, II
(74) *Attorney, Agent, or Firm* — Novak Druce Connolly Bove + Quigg LLP

(57) ABSTRACT

In a method for scanning edges of an object using a computing device, the computing device is connected to an image measuring machine including an image capturing device. A start point, an end point, a scan direction, and a scan distance interval are set. Scan points on the edges of the object are determined. For each scan point, the computing device aims the image capturing device at the scan point, controls the image capturing device to capture images of the object at different depths, and records focal points. Definition values of the images are calculated and an image with a highest definition value is determined. A focal point corresponds to the image with the highest definition value and so coordinates of the scan point are determined. Scanned edges of the object are formed based on all the scan points.

15 Claims, 6 Drawing Sheets

COMPUTING DEVICE AND METHOD FOR SCANNING EDGES OF AN OBJECT

BACKGROUND

1. Technical Field

The embodiments of the present disclosure relate to image measuring, and particularly to a computing device and method for scanning edges of an object.

2. Description of Related Art

Image measuring machines are used in industry to capture images of manufactured objects (e.g., metal castings) and measurements are taken from the images. To obtain an outline of an object, edges of the object are scanned using the image measuring machine. However, if the object is stepped or otherwise irregular, the scanned edges derived from scan points of the edges of the object may be stepwise (referring to FIG. 1).

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embedded in hardware or firmware, or to a collection of software instructions, written in a programming language. In one embodiment, the programming language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of a non-transitory computer-readable medium include CDs, DVDs, flash memory, and hard disk drives.

Figure 1:
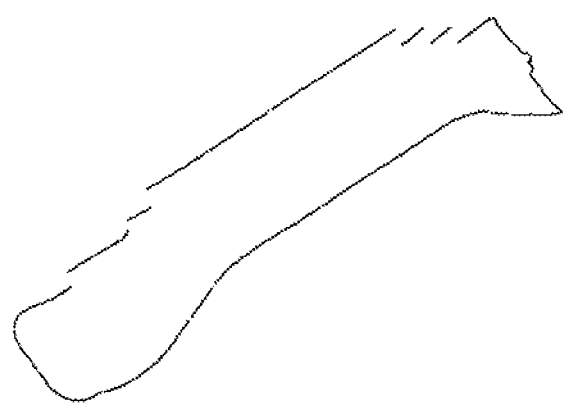
FIG. 1 illustrates one embodiment of a diagram of scanned edges of an object, where the scanned edges are stepwise.
Figure 2:
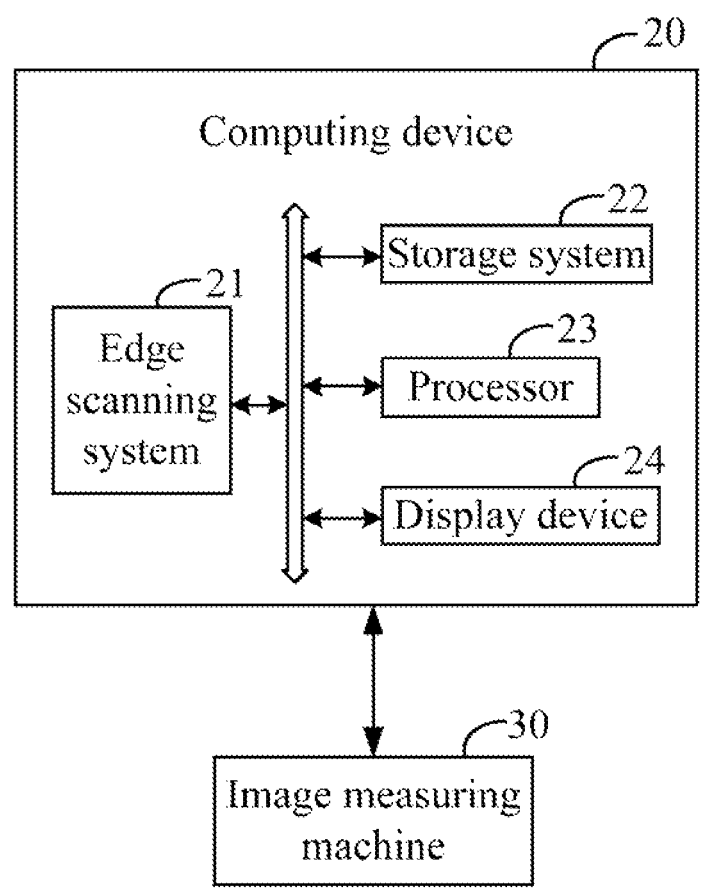
FIG. 2 is a block diagram of one embodiment of a computing device.

FIG. 2 is a block diagram of one embodiment of a computing device 20. In the embodiment, the computing device 20 is connected to an image measuring machine 30. The computing device 20 includes an edge scanning system 21 for scanning edges of an object (shown in FIG. 3). The object may be a molded part, such as a metal casting, for example.

The computing device 20 further includes a storage system 22, at least one processor 23, and a display device 24. In one embodiment, the storage system 22 may be a dedicated memory, such as an erasable programmable read-only memory (EPROM), a hard disk drive (HDD), or a flash memory. In some embodiments, the storage system 22 may also be an external storage device, such as an external hard disk, a storage card, or other data storage medium.

Figure 3:
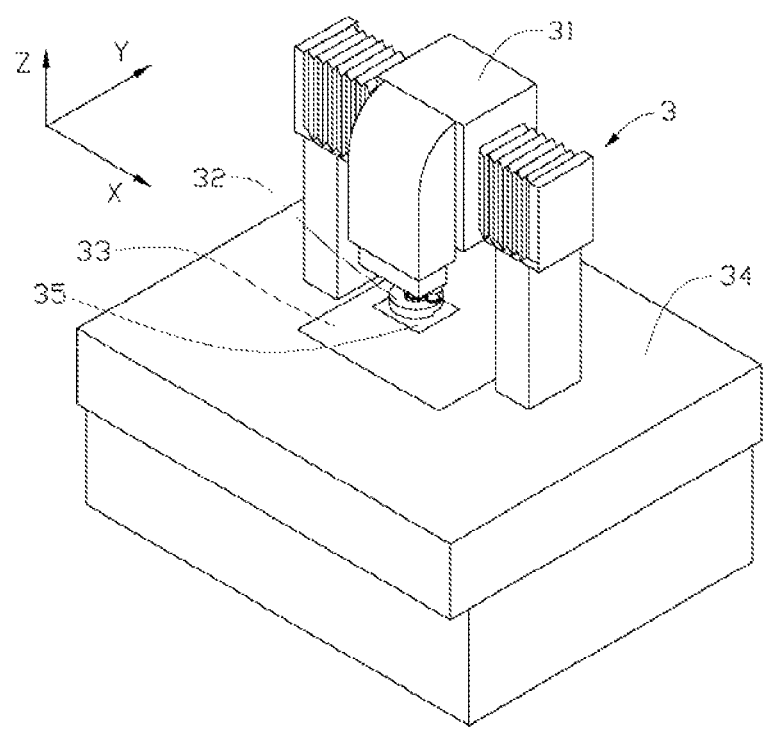
FIG. 3 is a block diagram of one embodiment of an image measuring machine in FIG. 2.

FIG. 3 is a block diagram of one embodiment of the image measuring machine 30 in FIG. 2. The image measuring machine 30 includes a top cover 31, an image capturing device 32, a work platform 33, and a holder 34. An object 35 to be measured is positioned on the work platform 33. The image measuring machine 30 may include other components to be described later, such as an X-axis motor, a Y-axis motor (not shown), and a Z-axis motor (not shown). The X-axis motor drives the work platform 33 to move along an X-axis and the Y-axis motor drives the work platform 33 to move along a Y-axis, so as to change a position of the object 35 on an XY plane. The Z-axis motor drives the image capturing device 32 to move along the Z-axis to focus on the object 35. The X-axis, Y-axis, and Z-axis constitute a coordinate system of the image measuring machine 30.

Figure 4:
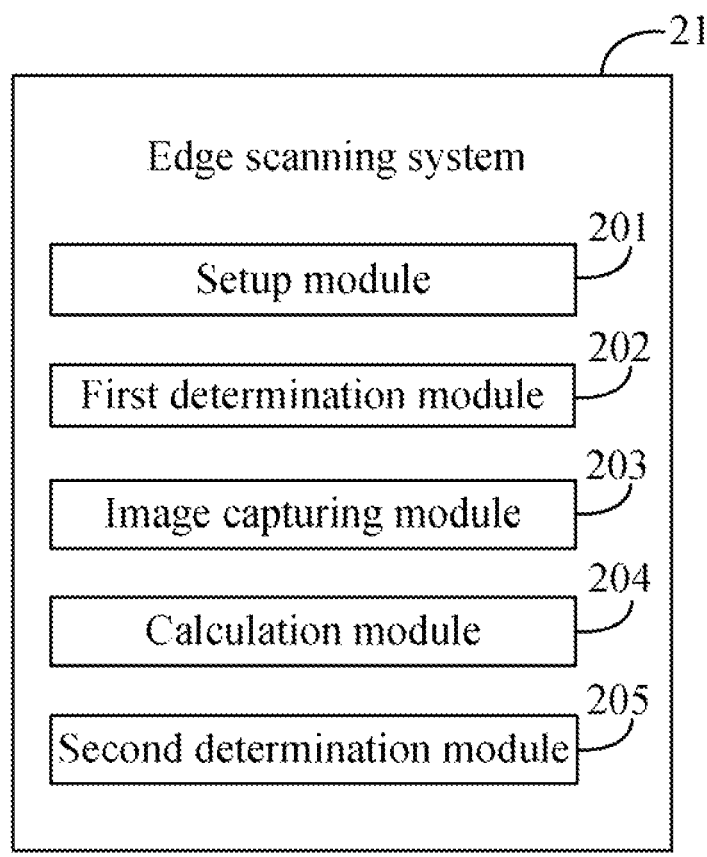
FIG. 4 is a block diagram of one embodiment of function modules of an edge scanning system in FIG. 2.

FIG. 4 is a block diagram of one embodiment of function modules of the edge scanning system 21 in FIG. 2. The edge scanning system 21 includes a setup module 201, a first determination module 202, an image capturing module 203, a calculation module 204, and a second determination module 205. The modules 201-205 may comprise computerized code in the form of one or more programs that are stored in the storage system 22. The computerized code includes instructions that are executed by the at least one processor 23, to provide the aforementioned functions of the edge scanning system 21. A detailed description of the functions of the modules 201-205 is given below in reference to FIG. 5.

Figure 5:
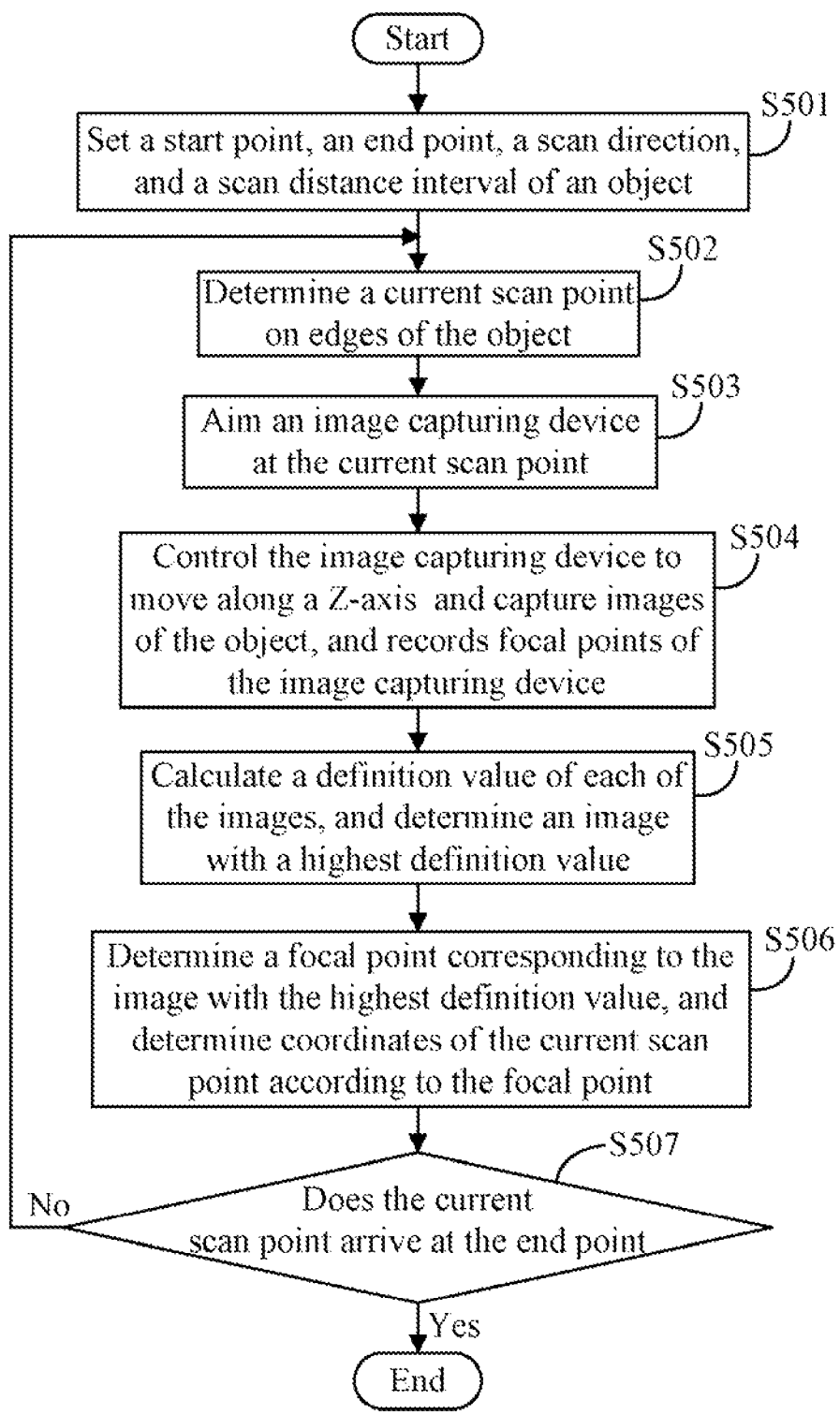
FIG. 5 is a flowchart of one embodiment of a method for scanning edges of an object using the computing device in FIG. 2.

FIG. 5 is a flowchart of one embodiment of a method for scanning edges of the object 35 using the computing device 20 in FIG. 2. Depending on the embodiment, additional steps may be added, others removed, and the ordering of the steps may be changed.

In step S501, the setup module 201 sets a start point and an end point of the object 35, and sets a scan direction and a scan distance interval for scanning the edges of the object 35. The start point, the end point, the scan direction, and the scan distance interval may be user-selected. The start point and the end point are on the edges of the object 35. The scan direction may be a clockwise direction or a counterclockwise direction. The scan distance interval is a distance between two adjacent scan points. In one embodiment, the scan distance interval is in pixels (e.g., 10 pixels).

In step S502, the first determination module 202 determines a current scan point on the edges of the object 35 according to the start point, the scan direction, and the scan distance interval. The first scan point of the object 35 is the start point. The last scan point of the object 35 is the end point. A distance between two adjacent scan points of the object 35 is equal to the scan distance interval. A direction from a scan point to a next scan point is in the scan direction. In one example, the scan distance interval is 10 pixels and the scan direction is clockwise. Therefore, the second scan point is 10 pixels away from the first scan point, and the direction from the first scan point to the second scan point is clockwise.

In step S503, the image capturing module 203 aims the image capturing device 32 at the current scan point. In one embodiment, the image capturing module 203 aims the image capturing device 32 at the current scan point by controlling the work platform 33 to move along the X-axis and along the Y-axis using the X-axis motor and the Y-axis motor of the image measuring machine 30. The image capturing module 203 may aim an optical axis of the image capturing module 203 at the current scan point.

In step S504, the image capturing module 203 controls the image capturing device 32 to move within a predetermined range (e.g., from 99 mm to 101 mm) along the Z-axis and capture images of the object 35, and records a focal point of the image capturing device 32 corresponding to each of the images. In one embodiment, the image capturing module 203 controls the image capturing device 32 to capture thirty images of the object 35 while the image capturing device 32 moves along the Z-axis. The image capturing device 32 may move along the Z-axis centered at a preset Z-coordinate (e.g., a Z-coordinate of 100 mm) for preset distances (e.g., 10 mm). The preset Z-coordinate may vary for different scan points. When the image capturing device 32 moves along the Z-axis, a Z-coordinate of the focal point of the image capturing device 32 varies, while an X-coordinate and a Y-coordinate of the focal point are unchanged.

In step S505, the calculation module 204 calculates a definition value of each of the images, and determines one image from the images with a highest definition value. The definition value of an image indicates the definition of the image. In one embodiment, the calculation module 204 calculates the definition value of an image according to gray values of the image. Each image is made of a plurality of pixels (e.g., 640*480 pixels). Each pixel of the image has a gray value. A formula for calculating a definition value of a pixel $P(i, j)$ of an image may be: $D(i, j)=Abs(Gray(i+1, j)-Gray(i-1, j))+Abs(Gray(i, j+1)-Gray(i, j-1))$, where $D(i, j)$ is the definition value of the pixel $P(i, j)$, $Abs()$ is a function for calculating an absolute value, $Gray(i, j)$ is a gray value of the pixel $P(i, j)$. The definition value of the image may be defined as an average value of definition values of all the pixels in the image.

In step S506, the calculation module 204 determines a focal point of the image capturing device 32 corresponding to the image with the highest definition value, and determines coordinates of the current scan point according to the focal point as determined. In one embodiment, the coordinates of the current scan point are same as the focal point corresponding to the image with the highest definition value.

In step S507, the second determination module 205 determines whether the current scan point arrives at the end point according to the coordinates of the current scan point. If the current scan point has not arrived at the end point, the process returns to step S502. Otherwise, if the current scan point has arrived at the end point, the process ends. That is, the computing device 10 has obtained all necessary scan points of the edges of the object 35.

Figure 6:
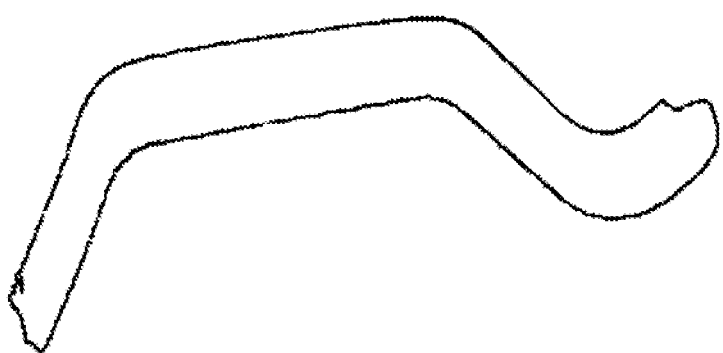
FIG. 6 illustrates one embodiment of a diagram of scanned edges of an object derived from scan points obtained by the computing device in FIG. 2, where the scanned edges are smooth.

FIG. 6 illustrates one embodiment of a diagram of scanned edges of the object 35. The exact outline is formed by connecting all the scan points of the edges of the object 35. The scanned edges of the object 35 may be displayed on the display device 24. The outline of the object 35 is smooth when the edge scanning system 21 is applied.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method for scanning edges of an object being executed by a processor of a computing device, the method comprising:
    setting a start point and an end point of the object, and setting a scan direction and a scan distance interval for scanning the edges of the object;
    determining a current scan point on the edges of the object according to the start point, the scan direction, and the scan distance interval;
    aiming an image capturing device at the current scan point, wherein the image capturing device is comprised in an image measuring machine connected to the computing device;
    controlling the image capturing device to move within a predetermined range along a Z-axis of the image measuring machine and capture images of the object, and recording a focal point of the image capturing device corresponding to each of the images;
    calculating a definition value of each of the images and determining an image with a highest definition value from the images;
    determining a focal point of the image capturing device corresponding to the image with the highest definition value, and determining coordinates of the current scan point according to the focal point of the image capturing device corresponding to the image with the highest definition value; and
    determining whether the current scan point arrives at the end point according to the coordinates of the current scan point;
    obtaining all scan points of the edges of the object if the current scan point arrives at the end point; and
    forming scanned edges of the object based on all the scan points.

2. The method of claim 1, wherein the image capturing device moves along the Z-axis centered at a preset Z-coordinate for preset distances.

3. The method of claim 1, wherein the definition value of each of the images is calculated according to gray values of each of the images.

4. The method of claim 1, wherein the scan distance interval is in pixels.

5. The method of claim 1, wherein the scan direction is a clockwise direction or a counterclockwise direction.

6. A computing device, comprising:
    a storage system;
    at least one processor; and
    an edge scanning system comprising one or more programs that are stored in the storage system and executed by the at least one processor, the one or more programs comprising instructions to:
    set a start point and an end point of the object, and set a scan direction and a scan distance interval for scanning edges of the object;
    determine a current scan point on the edges of the object according to the start point, the scan direction, and the scan distance interval;
    aim an image capturing device at the current scan point, wherein the image capturing device is comprised in an image measuring machine connected to the computing device;
    control the image capturing device to move within a predetermined range along a Z-axis of the image measuring machine and capture images of the object, and record a focal point of the image capturing device corresponding to each of the images;
    calculate a definition value of each of the images and determining an image with a highest definition value from the images;
    determine a focal point of the image capturing device corresponding to the image with the highest definition value, and determine coordinates of the current scan point according to the focal point of the image capturing device corresponding to the image with the highest definition value; and determine whether the current scan point arrives at the end point according to the coordinates of the current scan point;

obtain all scan points of the edges of the object if the current scan point arrives at the end point; and form scanned edges of the object based on all the scan points.

7. The computing device of claim 6, wherein the image capturing device moves along the Z-axis centered at a preset Z-coordinate for preset distances.

8. The computing device of claim 6, wherein the definition value of each of the images is calculated according to gray values of each of the images.

9. The computing device of claim 6, wherein the scan distance interval is in pixels.

10. The computing device of claim 6, wherein the scan direction is a clockwise direction or a counterclockwise direction.

11. A non-transitory computer-readable storage medium storing a set of instructions, the set of instructions capable of being executed by a processor of a computing device to implement a method for scanning edges of an object, the method comprising:

a start point and an end point of the object, and setting a scan direction and a scan distance interval for scanning the edges of the object;

determining a current scan point on the edges of the object according to the start point, the scan direction, and the scan distance interval;

aiming an image capturing device at the current scan point, wherein the image capturing device is comprised in an image measuring machine connected to the computing device;

controlling the image capturing device to move within a predetermined range along a Z-axis of the image measuring machine and capture images of the object, and recording a focal point of the image capturing device corresponding to each of the images;

calculating a definition value of each of the images and determining an image with a highest definition value from the images;

determining a focal point of the image capturing device corresponding to the image with the highest definition value, and determining coordinates of the current scan point according to the focal point of the image capturing device corresponding to the image with the highest definition value; and determining whether the current scan point arrives at the end point according to the coordinates of the current scan point;

obtaining all scan points of the edges of the object if the current scan point arrives at the end point; and forming scanned edges of the object based on all the scan points.

12. The storage medium of claim 11, wherein the image capturing device moves along the Z-axis centered at a preset Z-coordinate for preset distances.

13. The storage medium of claim 11, wherein the definition value of each of the images is calculated according to gray values of each of the images.

14. The storage medium of claim 11, wherein the scan distance interval is in pixels.

15. The storage medium of claim 11, wherein the scan direction is a clockwise direction or a counterclockwise direction.

* * * * *